US006195533B1

(12) United States Patent
Tkatch et al.

(10) Patent No.: US 6,195,533 B1
(45) Date of Patent: Feb. 27, 2001

(54) METHOD FOR STORING AN APPLICATION'S TRANSACTION DATA IN A WIRELESS MESSAGING SYSTEM

(75) Inventors: Randy T. Tkatch, Burnaby; Colin S. C. Quon, Vancouver, both of (CA)

(73) Assignee: Glenayre Electronics, Inc., Charlotte, NC (US)

(*) Notice: Subject to any disclaimer, the term of this patent is extended or adjusted under 35 U.S.C. 154(b) by 0 days.

(21) Appl. No.: 09/085,888

(22) Filed: May 27, 1998

(51) Int. Cl.[7] ....................................... H04Q 7/06
(52) U.S. Cl. .................. 455/38.1; 455/412; 455/31.2; 340/825.44
(58) Field of Search ................. 455/31.2, 31.3, 455/466, 422, 414, 38.1, 38.4, 517, 560, 556, 557, 412, 31.1, 413, 403; 340/825.44; 379/88.15

(56) References Cited

U.S. PATENT DOCUMENTS

| | | |
|---|---|---|
| 5,212,789 | 5/1993 | Rago . |
| 5,257,366 | 10/1993 | Adair et al. . |
| 5,809,415 | * 9/1998 | Rossmann ........................ 455/31.2 X |
| 5,905,944 | * 5/1999 | Goldman et al. .................. 455/31.3 |
| 5,918,158 | * 6/1999 | LaPorta et al. ................. 455/31.2 X |

* cited by examiner

Primary Examiner—Fan Tsang
Assistant Examiner—Phllip J. Sobutka
(74) Attorney, Agent, or Firm—Christsensen O'Connor Johnson Kindness PLLC

(57) ABSTRACT

A method for storing transaction data for an application in a wireless messaging system is disclosed. Applications can be used to allow paging messages to be entered into a wireless messaging system from external systems such as E-mail or the World Wide Web. Such applications may be implemented on an external application platform that includes the hardware system and system software required by the application. Applications often require the use of certain type of transaction data that has traditionally been stored in an application database designed specifically for this purpose by an application developer. The present invention provides a method for storing such transaction data without requiring the application developer to create a separate database. In the past, the development of such databases has been a significant burden on application developers. The present invention allows the application to store the necessary transaction data in a database inside the wireless messaging system, through the use of a code library that allows the application to send special networking messages to the wireless messaging system. In a hybrid system, the application may still have its own transaction database in which to store some types of transaction data, but may store other types of transaction data in a database in the wireless messaging infrastructure. The application's transaction database in these hybrid systems is simpler to design than those that store all the transaction data for the application.

20 Claims, 4 Drawing Sheets

METHOD FOR STORING AN APPLICATION'S TRANSACTION DATA IN A WIRELESS MESSAGING SYSTEM

FIELD OF THE INVENTION

The present invention relates to wireless messaging systems in general and, in particular, to methods for tracking information in wireless messaging systems.

BACKGROUND OF THE INVENTION

Wireless messaging systems such as paging systems have undergone significant changes in the past 20 years. Early paging units were simple radio receivers that beeped upon receipt of a paging signal from a paging service. With advancements in paging technology, it became possible to send message data to a paging unit. This message data could include alphanumeric messages. For example, a paging message could tell the user to call home, call the office, stop by the dry cleaners, etc. An increasing percentage of the information transmitted through these paging systems began coming from computerized sources, rather than through telephone numeric keypad entry. Such messages were entered as text into specialized computer programs that were only used for sending messages to pagers.

More recently, paging devices have been undergoing a revolution. New features in pagers include the ability to: accept binary data as well as text or numbers; transmit messages back to the caller; and be embedded into machines, such as a vending machine that can signal a home base on its own initiative when it is in need of servicing. Now technology is being developed to allow paging messages to come from sources such as E-mail or the World Wide Web.

In order for a separate system such as E-mail or the World Wide Web to be connected to a wireless messaging infrastructure that is used by the paging system, a computer software application must be developed to facilitate the flow of information between the two systems. The computer software application is run on an application platform that includes all of the hardware and supplemental software needed to run the application. Developers who wish to write such applications face many obstacles. For example, to write an application a developer may be required to know all of the coding formats that are being used over the air in the wireless messaging system and the types of pagers that are being used. Additional complexity has been added by the vast numbers of existing programs, computer platforms, and user interfaces that currently exist for paging systems.

While solutions have been developed for many of these problems, one problem in particular that has plagued application developers has been the task of developing application databases. Application databases are included in the application platform and store information required by the application; for example, a given application may need access to message information such as: the date and time that a paging call came in; the identity of a caller; the type of call (such as an E-mail page request or other); the page priority requested by the caller; or the text of the page request. Such information can be used by the application for whatever purposes the developer desires. For example, the information could be used to recreate a message if it were lost, to help facilitate the processing of replies to messages from a pager, or for general record keeping purposes regarding the flow of information through the system.

A usual requirement is that the application databases be real-time databases that can store data for potentially thousands or millions of transactions. It is also desirable that the data be accessible very quickly so that the application can process many calls per second. Development of this type of database has been a large burden on application developers. It often requires significant development time, which slows the process to market, and it requires designers to have advanced knowledge of real-time embedded systems designs. The present invention is directed to providing a method of developing applications that overcomes the foregoing and other disadvantages. More specifically, the present invention is directed to a method of tracking message data for an application without requiring the application to have an application database.

SUMMARY OF THE INVENTION

A method for storing transaction data for an application is disclosed. The application is created on a platform that is external to the paging infrastructure. An example of this type of application would be an Internet Gateway application using a Sun workstation. A caller sends a paging message to the application for further transmittal through the wireless messaging infrastructure to a pager. The application processes the message so that the necessary format and information is sent to the wireless messaging infrastructure.

According to one aspect of the invention, certain transaction data that would otherwise be stored by the application in its own database is instead stored in a database in the wireless messaging infrastructure. Such transaction data may include information such as: the date and time that a call came in; the identity of the caller; the type of call (examples: WWW page request versus an E-mail page request); page priority requested by the caller; or the complete text of the page request. The method the application uses to store data in the database of the wireless messaging infrastructure includes a special set of networking messages between a code library and the wireless messaging infrastructure that instruct the wireless messaging infrastructure to perform the desired data storage functions. When the data is to be returned from the wireless messaging infrastructure to the application, another set of networking messages are used that allow the application to process the transaction data as if it had come from its own database.

In accordance with another aspect of the invention, when the invention is being used, the application passes all transaction data through the wireless messaging infrastructure when originating a page request, and the wireless messaging infrastructure returns all of this data when returning any responses back to the application. In this mode the application is "state-less," in that the application is not keeping track of the state of a transaction.

As another aspect of the invention, the application is still able to have its own transaction database as more software within the same platform. Then some types of transaction data may be stored in the application's transaction database, while other types of transaction data are stored in a database in the wireless messaging infrastructure. Under such circumstances, the wireless messaging infrastructure passes a unique transaction ID when returning responses back to the application, so that the application can reference the appropriate transaction in its database.

It will be appreciated that the disclosed method of tracking transaction data for an application is advantageous in that it lessens the burden on applications developers. Through use of this method, applications developers do not have to design their own transaction databases. The method thus increases the chances that more successful applications will be produced by designers who are not necessarily experts in real-time embedded systems design. The time to market for such applications is thus also reduced. In addition, in hybrid systems where the application still includes its own database for storing some types of transaction data, the complexity and requirements for developing the database are significantly reduced by storing the remaining transaction data in the wireless messaging infrastructure.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
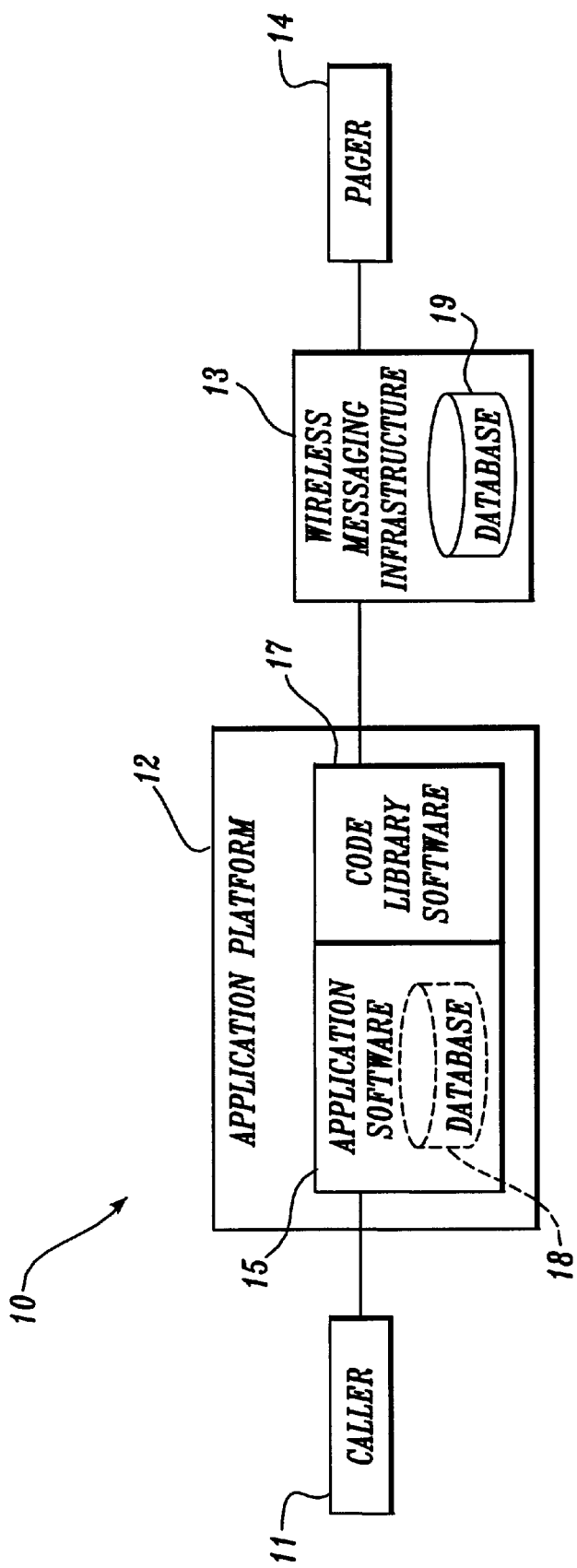
FIG. 1 is a block diagram of a paging system wherein, in accordance with the present invention, the inclusion of a transaction database in the application platform is optional.

The major components of a paging system 10 are illustrated in FIG. 1. A common type of information that passes through paging systems are message packets that are entered by a caller to be broadcast to a particular paging unit. The message packets of this type may be entered into the paging system 10 by a caller 11 through an application platform 12. An application platform includes the hardware system and the system software used by an application. Application platform 12 includes application software 15 and code library software 17. The application software 15 interfaces to the wireless messaging infrastructure 13 via the code library 17. The code library 17 enables the application 15 to make software procedural calls that result in networking messages between the code library 17 and the wireless messaging infrastructure 13. In accordance with the present invention, the application software 15 may or may not include a transaction database 18. In the prior art, the application software was generally required to include a transaction database.

The wireless messaging infrastructure 13 includes a database 19. According to the method of the present invention, information regarding the message transaction that would otherwise need to be stored in a database in the application platform may instead be stored in the database 19 in the wireless messaging infrastructure 13. In the prior art, information that was normally stored in the database 19 of the wireless messaging infrastructure 13 only included items such as: the date and time the call was sent to the pager, and a pointer to the section of memory where information about the pager is stored. In accordance with the present invention, additional information that was normally stored in the application database may now be stored in the database 19 through the use of a special set of networking messages that are produced by procedural calls made by the application 15 through use of the code library 17.

Transaction data that was normally stored in a database 18 in the application platform 12 often included information such as: the date and time that the message came in; the identity of the caller; the type of call (i.e., WWW page request versus an E-mail page request); the page priority requested by the caller; or the complete text of the page request. In the method of the present invention, all of this transaction data may be passed with the paging message when it is sent from the application software 15 via the code library 17 to the wireless messaging infrastructure 13. The wireless messaging infrastructure 13 then stores all the transaction data in the database 19, according to the special networking messages from the application platform 12 that were included with the data.

Once the wireless messaging infrastructure 13 has received the paging message, it attempts to transmit the paging message to the pager 14. The pager 14 may respond to the paging messages from the wireless messaging infrastructure 13 in a number of ways; for example, one type of response may simply indicate that the paging message has been successfully received. Once the wireless messaging infrastructure 13 receives the response from the pager 14, it sends the necessary information regarding the response to the application platform 12 and includes the necessary transaction data that is stored in the database 19. The necessary transaction data is processed by the application 15 through use of a special set of networking messages through the use of the code library 17. In this way, the application 14 receives the transaction data that it needs without having to store the data in a transaction database of its own.

Figure 2:
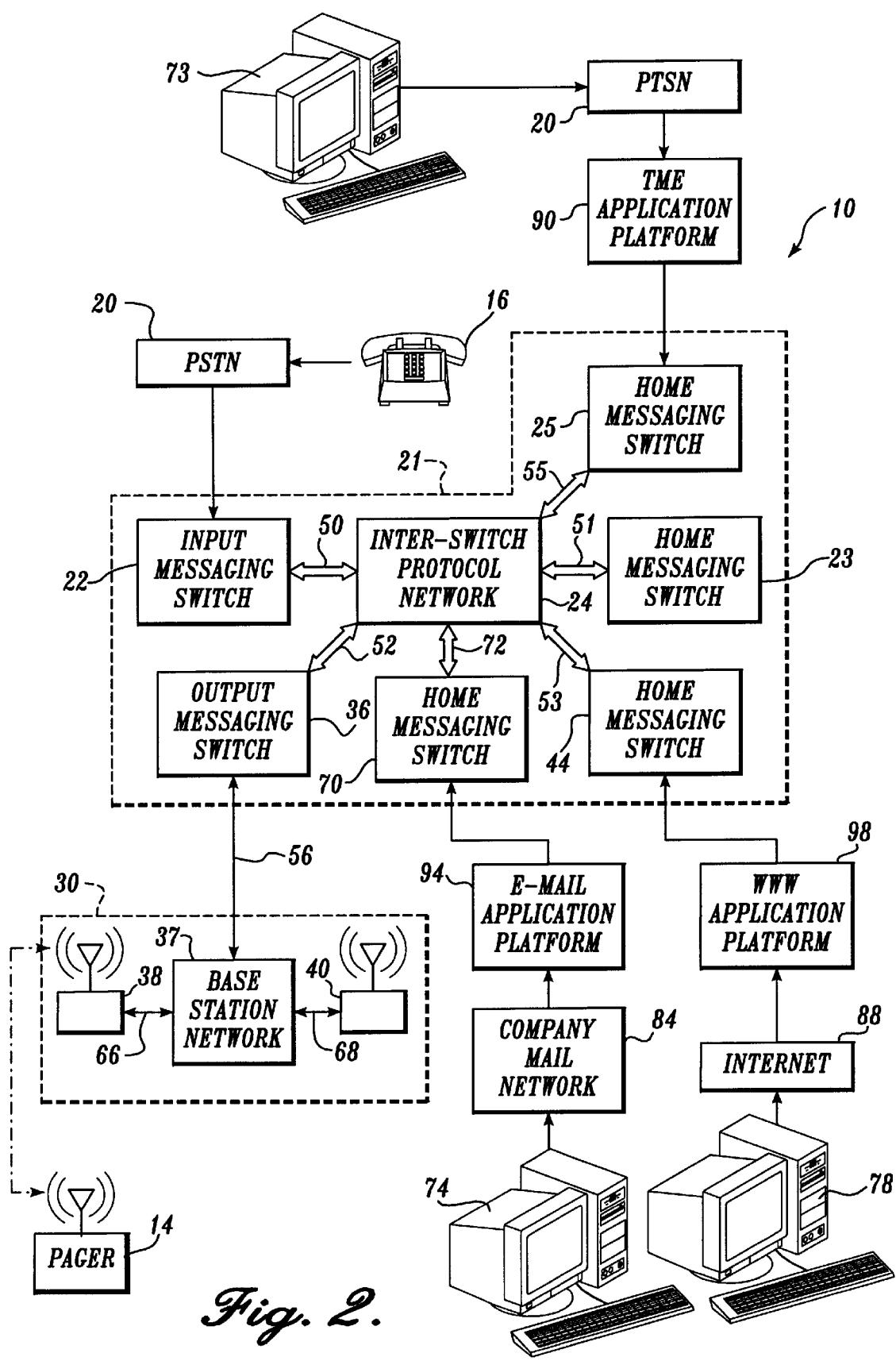
FIG. 2 is a block diagram of the paging system of FIG. 1 illustrating various types of application platforms and the components of the wireless messaging infrastructure.

A more detailed diagram of a paging system 10 that illustrates some types of application platforms and some of the components of the wireless messaging infrastructure is shown in FIG. 2. A common type of information that passes through paging systems are message packets that are entered by a user to be broadcast to a particular paging unit. The passage of a message packet through the paging system will initially be described below with reference to the standard telephone entry method, and then later the procedures for application platforms will be described.

Message packets for standard telephone entry may be entered into the paging system 10 via a public switched telephone network 20 from a standard telephone 16. The message packets are then transferred to an input messaging switch 22 that receives specific phone lines and is an input component to a messaging switch system 21. The messaging switch system 21 includes the input messaging switch 22 as an input device, several home messaging switches 23, 25, 44, and 70 as information storage devices, an output messaging switch 36 as an output device, and an interswitch protocol network 24 that connects all of the messaging switches. In some systems, input messaging switches and home messaging switches may be aspects of the same physical piece of equipment. The protocols used by the messaging switch system 21 govern how messages are sent between the messaging switches 22, 23, 25, 36, 44, and 70. While the messages being sent between the messaging switches are often referred to as "message packets," or simply "messages," they may actually be any type of application protocol data unit (APDU), which is a "packet" form in which data or commands may be sent between any of the messaging switches.

From the input messaging switch 22, the message packets are then passed via a communication link 50 through an interswitch protocol network 24 to home messaging switch 23, 25, 44, or 70, via communication link 51, 55, 53, or 72, respectively. Communication links 50, 51, 53, 55, and 72 may be either simple wires, microwave links, satellite links, or any other suitable communication path. Home messaging switches contain information storage databases required for paging units. All information sent to and from the paging unit passes through the paging unit's home messaging switch. The home messaging switch database temporarily stores incoming message packets and subsequently sends the messages through output switches to the paging unit, as described below. The messaging switch database also keeps the database record regarding a paging unit, including information as to the present registered location of the paging unit, the date and time a call was sent to the pager, and a pointer to the section of memory where information about the pager is stored. As described in more detail below, in accordance with the present invention, the home messaging switch database may also be manipulated by a special set of networking messages to cause it to store additional data for an external system.

From one of the home messaging switches 23, 25, 44, or 70, the message packet is then transferred via communication link 51, 53, 55, or 72 back through the interswitch protocol network 24 to output messaging switch 36 via communication link 52. Output messaging switch 36 is an output component of the messaging switch system 21. Output messaging switch 36 may generally be associated with certain transmitters or geographical areas covered by the transmitters. Thus, output messaging switch 36 may represent transmitters for a particular area of coverage, such as a particular city, and message packets to be broadcast in that city would be sent to that output messaging switch. For example, message packets from output messaging switch 36 are sent to transmitting system 30, via communication line 56. Message packets sent to transmitting system 30 are sent through base station network 37 and then selectively sent via communication link 66 or 68 to base station 38 or 40, respectively, to be broadcast to a paging unit 14 within that geographical region. Base stations 38 and 40 are capable of both broadcasting and receiving signals to and from remote paging units, because both transmitters and receivers are located at the base stations. Alternatively, the receivers may be located at different locations from the base station transmitters.

In addition to the standard telephone entry method, paging messages may also be entered into the wireless messaging infrastructure 21 through various application platforms. An application platform includes the hardware system and the system software used by the application. While a platform can be custom built, it is instead often based on existing hardware, such as a Unix or PC-based computer. Example application platforms are shown in FIG. 1, including a telocator message entry protocol (TME) application platform 90, an E-mail application platform 94, and a World Wide Web (WWW) application platform 98. Paging messages to the TME application platform 90 are entered through a personal computer 73 and are then routed through a public switched telephone network 20. Paging messages to the E-mail application platform 94 are entered through a personal computer 74 and then pass through a company mail network 84. Paging messages for WWW application platform 98 are entered through a personal computer 78 and then pass through the Internet 88.

Applications platforms 90, 94, and 98 can interface with the messaging switches of the paging network 21 through the use of networking messages produced through use of a code library. An example of a code library is sold in a computer program called WMapi™ (Wireless Messaging Applications Programming Interface), which is sold by Glenayre Electronics™. The program is essentially a set of function calls that an application developer can use to gain access to a wireless messaging network. In essence, the program hides the complexity of the wireless messaging network and promotes a simple standard interface to access the messaging switches. WMapi™ allows developers to write an application on a platform that is external to the wireless messaging infrastructure. Although most of the function calls of the WMapi™ program have helped simplify the interface between an application platform and the wireless messaging infrastructure, a problem that has continued to plague application developers is the task of developing the application's database.

Through the use of a code library, the application platforms 90, 94, and 98 are able to be external to the wireless messaging infrastructure 21 and yet have similar functions to an input messaging switch such as input messaging switch 22. The hardware of the platforms 90, 94, and 98 can be custom built, but they are often based on existing hardware such as a Unix or PC-based computer. Just as messages through input messaging switch 22 usually pass through a home messaging switch before passing to output messaging switch 36, an application platform that is functioning as an input messaging switch also sends its messages first to a home messaging switch before they go to output messaging switch 36. In other words, an application platform is normally connected to the wireless messaging infrastructure 21 through a "gateway" home messaging switch. As shown in FIG. 2, TME application platform 90 is connected to home messaging switch 25, E-mail application platform 94 is connected to home messaging switch 70, and WWW application platform 98 platform is connected to home messaging switch 44.

As described above, home messaging switches contain information storage databases required for paging units. The home messaging switch database keeps the database record regarding a paging unit, including information as to the present registered location of the paging unit, the date and time a call was sent to the pager, and a pointer to the section of memory where information about the pager is stored. In accordance with the present invention, through manipulation by a special set of networking messages produced through use of the code library, the home messaging switch database may also be made to store transactional data as required by the external application platform. As described above, such additional transaction data may include: the date and time that a paging message came in; the identity of the caller; the type of call (i.e., WWW page request versus an E-mail page request); the page priority requested by the caller; or the complete text of the page request. Thus, application platforms 90, 94, and 98 may manipulate the home messaging switch databases in the home messaging switches 25, 70, 44, and 23 to store the transactional data that would otherwise need to be stored in a database designed especially for the application platforms. As described above, the design of such databases has traditionally been a significant burden for applications developers both in terms of the development time and the required advanced knowledge of real-time embedded systems designs. By allowing the use of the home messaging switch database in the wireless messaging infrastructure to store such transaction data, the process of developing such applications is significantly simplified.

Figure 3:
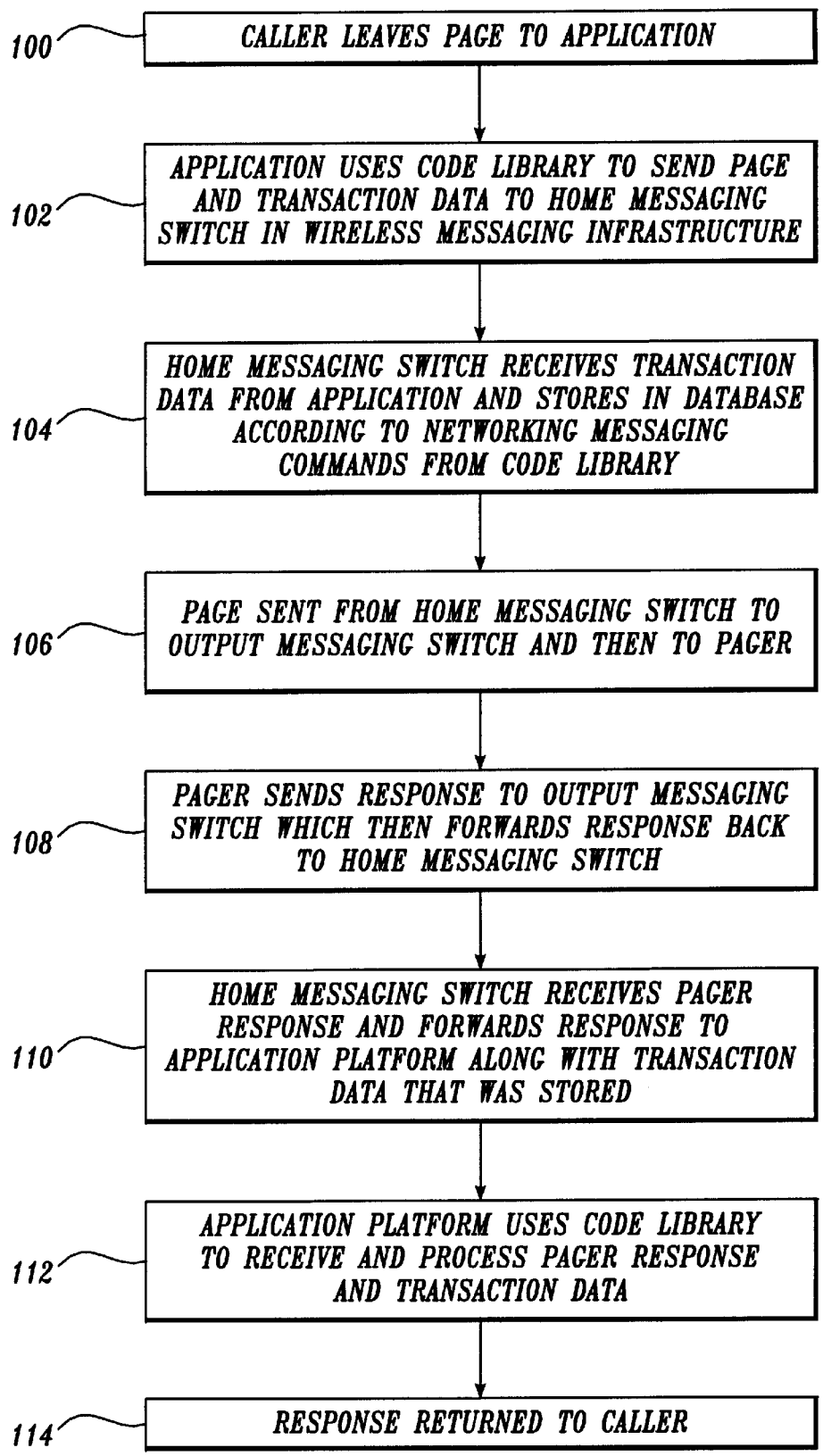
FIG. 3 is a flow chart of an application platform's message processing routine in a paging system of the present invention wherein the application platform does not have its own transaction database.

FIG. 3 is a flow chart of an application platform's message processing routine in a paging system of the present invention, wherein the application platform does not have its own transaction database. At a block 100 a caller leaves a page to the application. The page may be entered through a personal computer or by other means, and then may pass through a public switched telephone network, a company mail network, the Internet, or other medium to reach the application platform. Once the application receives the page, at a block 102 the application uses a code library to send the page and the transaction data to a home messaging switch in the wireless messaging infrastructure. As described earlier, the home messaging switch is the "gateway" through which the application platform is connected to the wireless messaging infrastructure.

At a block 104 the home messaging switch receives the page and transaction data from the application, along with the special set of networking messages produced from the code library to instruct the home messaging switch. Once the home messaging switch receives this information, it proceeds according to the commands from the networking messages, and, in addition to storing the normal information with regard to the page, it also stores the transaction data that was specially sent from the application platform. At a block 106 the page is sent from the home messaging switch to an output messaging switch in the wireless messaging infrastructure, and then to the pager. The pager responds at a block 108 where the response is received by the output messaging switch in the wireless messaging infrastructure and sent back to the home messaging switch that originated the page.

At a block 110 the home messaging switch in the wireless messaging infrastructure receives the response from the pager and forwards it to the application platform, along with the transaction data that was stored in the home messaging switch from the application platform. The home messaging switch knows to return the data with the response because the transaction data is an "optional field" that if used will set a bit in the home messaging switch database, causing it to return the data in the response transaction. At the block 112, the application platform uses the code library to receive the response from the pager and process the transaction data. At a block 114, a response is returned to the caller.

The method of tracking transaction data disclosed herein is advantageous in that it allows an application to have access to the data it needs without requiring the application developer to design a separate transaction database. As discussed above, the development of such databases has been a significant burden on applications developers, resulting in fewer successful applications being developed and slower times to market.

Figure 4:
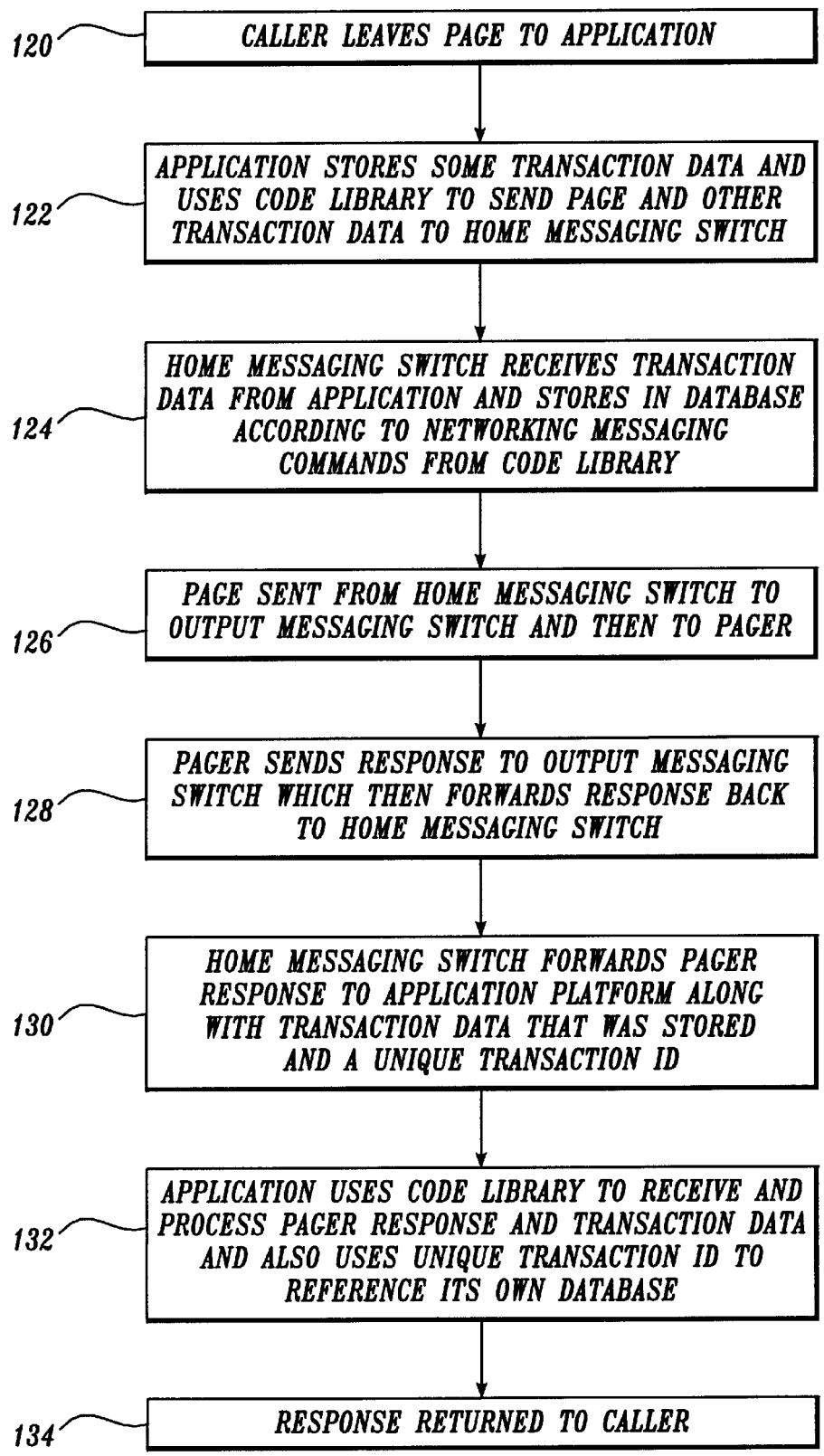
FIG. 4 is a flow chart of an application platform's message processing routine in a hybrid paging system wherein the application platform uses both its own transaction database and a database of the wireless messaging infrastructure.

Even when an application developer is required to design a transaction database to store some transaction data for the application, the database may be made much simpler by limiting the types of transaction data it must store. In such hybrid systems, some of the transaction data is stored in the application's database, and some of it is stored in the wireless messaging infrastructure. FIG. 4 is a flow chart of an application platform's message processing routine in a hybrid paging system of the present invention, wherein the application platform maintains its own transaction database for storing certain types of transaction data, but also manipulates the database of a home messaging switch to store other types of transaction data. This messaging processing routine is somewhat similar to the message processing routine of FIG. 3. At a block 120, a caller leaves a page to the application. Once the application receives the page, at a block 122, the application stores some types of transaction data in its own database and then uses a code library to send the page and other types of transaction data to a home messaging switch in the wireless messaging infrastructure.

At a block 124, the home messaging switch receives the page and transaction data from the application, along with a special set of networking messages produced from the code library to instruct the home messaging switch to store the transaction data. At a block 126, the page is sent from the home messaging switch to an output messaging switch and then to the pager. At a block 128, the pager responds to the output messaging switch, which forwards the response to the home messaging switch.

At a block 130, the home messaging switch receives the response from the pager and forwards it to the application platform along with the transaction data that was stored in the home messaging switch at the request of the application platform and along with a unique transaction ID. The unique transaction ID allows the application to reference the appropriate transaction in its database. At a block 132, the application platform uses the code library to receive the response from the pager along with the transaction data that was stored in the wireless messaging infrastructure, and uses the unique transaction ID to locate transaction data in its own database regarding the same page transaction. The application platform may then use both types of transaction data as needed. At a block 134 a response is returned to the caller.

The present invention has been described in relation to a preferred embodiment and several variations. One of ordinary skill after reading the foregoing specification will be able to effect various other changes, alterations, and substitutions of equivalents without departing from the broad concepts disclosed. It is therefore intended that the scope of the letters patent granted hereon be limited only by the definition contained in the appended claims and equivalents thereof, and not by limitations of the embodiments described thereof.

What is claimed is:

1. In a paging system, a method for tracking transaction data regarding messages that are sent to a pager, the paging system having an application platform and a wireless messaging infrastructure, the application platform including an application, the wireless messaging infrastructure having a database, the method comprising the steps of:

(a) a paging message being received by an application including certain transaction data about the paging message;

(b) the application sending the paging message and the transaction data to the wireless messaging infrastructure along with at least one networking message to instruct the wireless messaging infrastructure to store the transaction data such that the transaction data is stored by the wireless messaging infrastructure rather than by the application; and (c) the wireless messaging infrastructure storing the transaction data in a database and returning at least some of the transaction data to the application at selected times so that the application can receive the transaction data when it is needed.

2. The method of claim 1, further comprising the step of the wireless messaging infrastructure returning the transaction data from the database to the application when a reply from the pager is sent from the wireless messaging infrastructure to the application.

3. The method of claim 2, wherein the wireless messaging infrastructure is caused to return the transaction data with the reply from the pager by designating the transaction data as an optional field that when used sets a bit in the wireless messaging infrastructure database that causes the database to return the transaction data with the reply from the pager.

4. The method of claim 1, wherein the application is state-less in that the application platform does not have its own transaction database and the application is therefore not keeping track of the state of the transaction.

5. The method of claim 1, wherein the application platform includes a code library that is used by the application to generate the networking messages to the wireless messaging infrastructure.

6. The method of claim 1, wherein the application platform further includes a database, the application storing certain types of transaction data in the application database and sending other types of transaction data to the wireless messaging infrastructure to be stored.

7. The method of claim 1, wherein a home messaging switch in the wireless messaging infrastructure comprises the database where the transaction data that was sent from the application is stored.

8. The method of claim 1, wherein the application supports the sending of paging messages from an electronic-mail system.

9. The method of claim 1, wherein the application supports the sending of paging messages from the World Wide Web system.

10. The method of claim 1, wherein the application supports the sending of paging messages from a Telocator Message Entry system.

11. The method of claim 10, wherein a home messaging switch in the wireless messaging infrastructure comprises the database where the transaction data that was sent from the application is stored.

12. The method of claim 10, further comprising the step of the application using the transaction data returned from the wireless messaging infrastructure to generate a response to the caller that sent the original paging message.

13. The method of claim 10, wherein data generated by the wireless messaging infrastructure is included along with the transaction data that is returned from the wireless messaging infrastructure to the application platform.

14. The method of claim 10, wherein the transaction data returned from the wireless messaging infrastructure is used to keep track of the flow of information through the application platform.

15. The method of claim 14, wherein a home messaging switch in the wireless messaging infrastructure comprises the database where the data that is sent by the application is stored.

16. The method of claim 14, further comprising the step of the wireless messaging infrastructure returning the data to the application when a response is received from the pager.

17. The method of claim 16, wherein the wireless messaging infrastructure is caused to return the data with the response from the pager by designating the data as an optional field that when used sets a bit in the wireless messaging infrastructure database that causes the database to return the data with the response from the pager.

18. In a paging system, a method for tracking transaction data regarding paging messages, the paging system having an application platform, a wireless messaging infrastructure, and a pager, the application platform including an application for facilitating the sending of paging messages from an external system, the wireless messaging infrastructure having a database, the method comprising the steps of:

(a) the application using a code library to send at least one networking message to the wireless messaging infrastructure;

(b) the database in the wireless messaging infrastructure being instructed by the networking message to store the transaction data that is sent from the application platform such that the application platform does not need to store the transaction data; and (c) the database in the wireless messaging infrastructure returning at least some of the transaction data that was not stored at the application platform to the application platform when a response is received from the pager.

19. The method of claim 18, wherein the database in the wireless messaging infrastructure is caused to return the transaction data with the response from the pager in step (c) by designating the transaction data as an optional field that when used sets a bit in the wireless messaging infrastructure database that causes the database to return the transaction data with the response from the pager.

20. In an application for facilitating the transmission of paging messages through a wireless messaging infrastructure, the paging messages originating from an external system, a method for allowing the application to store data in the wireless messaging infrastructure, the method comprising the steps of:

(a) the application collecting certain data in relation to the paging messages;

(b) the application accessing a code library that can be used to generate networking messages to the wireless messaging infrastructure; and (c) the application using the code library to generate at least one networking message that instructs the wireless messaging infrastructure to store data sent by the application in a database in the wireless messaging infrastructure, the application not storing at least some of the data, the application instead relying on receiving at least some of the stored data from the database in the wireless messaging infrastructure when the data is needed by the application.

* * * * *